United States Patent [19]

Yamashita

[11] Patent Number: 4,924,315
[45] Date of Patent: May 8, 1990

[54] VIDEO SIGNAL PROCESSING SYSTEM

[75] Inventor: Yasushi Yamashita, Atsugi, Japan

[73] Assignee: Kabushiki Kaisha Yamashita Denshi Sekkei, Atsugi, Japan

[21] Appl. No.: 316,762

[22] Filed: Feb. 28, 1989

[30] Foreign Application Priority Data

May 23, 1988 [JP] Japan .............................. 63-125466

[51] Int. Cl.$^5$ .......................................... H04N 5/213
[52] U.S. Cl. .................................. 358/160; 358/167; 358/140; 364/521
[58] Field of Search ............... 358/140, 160, 167, 463, 358/36; 364/521

[56] References Cited

U.S. PATENT DOCUMENTS 3,584,235  6/1971  Fukui ................................... 358/167
3,700,797 10/1972  Wernikoff ........................... 358/463

Primary Examiner—Howard W. Britton
Attorney, Agent, or Firm—Fleit, Jacobson, Cohn, Price, Holman & Stern

[57] ABSTRACT

The video signals outputted from a computer in a format of sequential scanning are memorized in a frame memory after being processed so that the isolated luminance signals do not exist in each horizontal scanning line. Furthermore, the video signals are read out from the frame memory in a format of interlaced scanning.

5 Claims, 3 Drawing Sheets

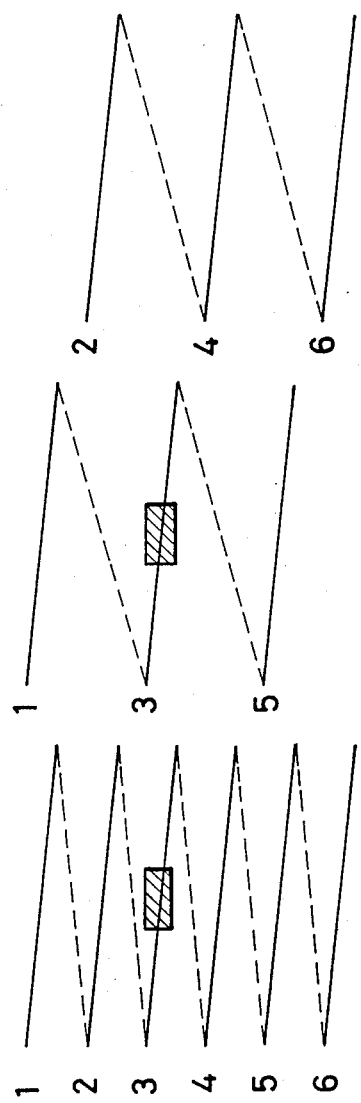

VIDEO SIGNAL PROCESSING SYSTEM

BACKGROUND OF THE INVENTION

The invention relates to a video signal processing system which converts video signals from a format of sequential scanning to that of interlaced scanning.

In a computer system such as a personal computer or an engineering workstation, the video signal has a format of sequential scanning and more horizontal scanning lines than the television broadcasting system such as NTSC, PAL, or SECAM which has a format of interlaced scanning. Accordingly, the image which is formed according to the video signal outputted from the computer system and shown on the standard television monitor includes flickers generally.

The principle of generation of flickering will be described below with reference to FIGS. 4A, 4B and 4C. FIG. 4A shows typical video signals in the format of sequential scanning. As shown in the figure, the horizontal scanning lines are scanned in series in order of 1, 2, 3, 4 ... from top to bottom. The video signals of one frame are stored in a frame memory, for example. After that, the odd horizontal scanning lines are read out from the memory in order of 1, 3, 5 ... and they constitute the first field as shown in FIG. 4B. Similarly, the second field comprises the even lines of 2, 4, 6 ... as shown in FIG. 4C. By this reading of the odd and even lines, the video signals of one frame comprising two fields in the format of interlaced scanning are obtained.

However, where there exists an isolated luminance signal which is shown typically as a shaded area in FIG. 4A only in one specific horizontal scanning line (in the 3rd line in the embodiment), the luminance signal is present in the first field as shown in FIG. 4B; but not in the second field as shown in FIG. 4C. Therefore, since in NTSC system the frame time period is one-thirtieth seconds, in other words the field time period is one-sixtieth seconds, the luminance signal is present every one-thirtieth seconds and is observed as flickers by the viewers. Similarly in the PAL or SECAM system it is present every one-fiftieth seconds.

SUMMARY OF THE INVENTION

An object of the invention is to solve the problems stated above.

Another object of the invention is to provide a video signal processing system comprising a processing circuit for processing input video signals in a format of sequential scanning so that each horizontal scanning line of the video signals does not include the isolated luminance signals, a memory for memorizing the video signals processed by the processing circuit, and a reading means for reading out the video signals memorized in the memory and generating video signals in a format of interlaced scanning, wherein the processing circuit comprises a first delaying circuit for delaying the input video signals by 1H, a second delaying circuit for delaying by 1H the video signal delayed by the first delaying circuit, a first coefficient multiplier for multiplying the input video signals by a first coefficient, a second coefficient multiplier for multiplying the video signals delayed by the second delaying circuit by a second coefficient, and an adding circuit for adding the outputs from the first and second coefficient multipliers and the first delaying circuit.

When there exist flicker components in specific horizontal scanning line in a format of sequential scanning, the attenuated flicker components are added to the horizontal scanning lines preceding and following the specific horizontal scanning line. Therefore, the flicker generation is reduced in the image in a format of interlaced scanning.

BRIEF DESCRIPTION OF THE DRAWINGS

FIGS. 4A to 4C are explanatory drawings for showing the principle of flicker generation according to the prior art.

DETAILED DESCRIPTION OF THE PREFERRED EMBODIMENT

Figure 2:
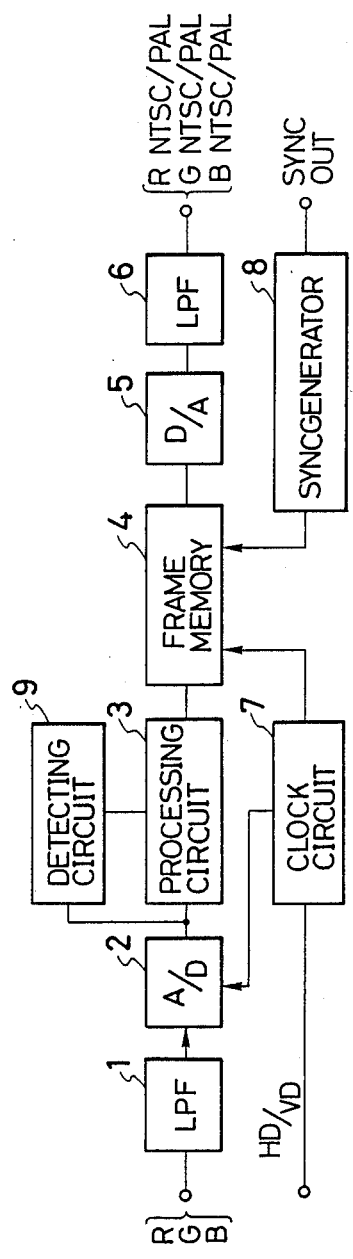
FIG. 2 is a block diagram of a video signal processing system according to the invention.

In FIG. 2, the reference numeral 1 designates a low-pass filter which cuts the high-frequency components for limiting the frequency band and passes low-frequency components of R, G and B video signals in a format of sequential scanning which are outputted from a computer not shown and inputted to filter 1. The low-pass-filtered input video signals are inputted to analog-to-digital converter 2 and converted from analog signals to digital signals. Clock circuit 7 generates clock pulses necessary for analog-to-digital processing in synchronism with the horizontal and vertical scanning signals in the computer.

The output signals of analog-to-digital converter 2 are inputted to processing circuit 3 and detecting circuit 9. Detecting circuit 9 detects the correlation between the two sequential horizontal scanning lines of the video signals by comparing the levels of luminance signals in two lines for example. The processing by processing circuit 3 is controlled by the detecting results in detecting circuit 9. When it is detected that the two horizontal scanning lines are in strong correlation, in other words, there exists no flicker component in the horizontal scanning lines, processing circuit 3 passes the signals inputted from converter 2 to frame memory 4 without processing them. While when the lines are in weak correlation, namely when there exist flicker components, processing circuit 3 outputs the signals after processing them. The output signals from processing circuit 3 are inputted to and memorized in frame memory 4. The clock pulses necessary for processing in frame memory 4 are provided from clock circuit 7.

When the video signals of one frame in the format of sequential scanning are stored in frame memory 4, they are read out in the format of interlaced scanning in the same way as in the FIGS. 4A to 4C in synchronism with clock pulses which are generated by sync-generator 8 in synchronism with the horizontal and vertical synchronizing signals in the system of NTSC, PAL, SECAM or other interlaced format. The data read out from memory 4 is inputted to digital-to-analog converter 5 and converted from digital signals to analog signals. After being eliminated unnecessary high-frequency components by low-pass filter 6, the video signals are provided CRT not shown together with the horizontal and vertical synchronizing signals which are genrarted by sync-generator 8.

Figure 1:
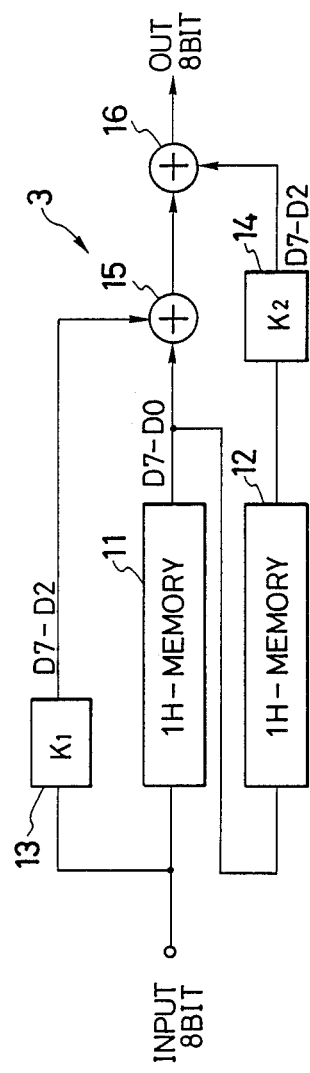
FIG. 1 is a block diagram of a processing circuit according to the invention.

FIG. 1 is a block diagram of processing circuit 3. The digital video signals outputted from converter 2 are inputted to coefficient multiplier 13 and multiplied by a coefficient $K_1$. Therefore, the signals are reduced to specific levels and inputted to adder 15. In the embodiment, coefficient multiplier 13 comprises a shift register which reduces the video signal level by half by shifting the 8-bits data by one bit.

Also the signals outputted from converter 2 are inputted to 1H-memory 11 by which the inputted signals are delayed by 1H (H: horizontal scanning period). The signals outputted from coefficient circuit 13 and 1H-memory 11 are added by adder 15.

The signals outputted from 1H-memory 11 are further delayed by 1H-memory 12 by 1H and inputted to coefficient multiplier 14 which comprises a shift register. The video signals are multiplied by a coefficient $K_2$ and reduced by half in level. The signals outputted from adder 15 and coefficient multiplier 14 are added by adder 16 and outputted to frame memory 4.

Figure 3A:
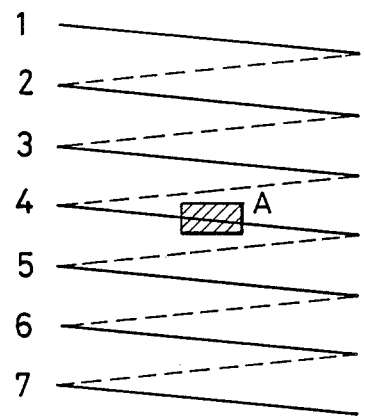
FIGS. 3A to 3D are explanatory drawings for showing the principle of video signal processing according to the invention.
Figure 3B:
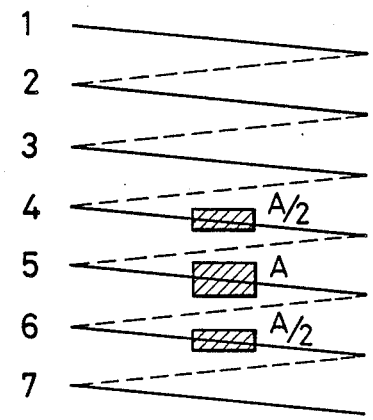

The operation of processing circuit 3 shown in FIG. 1 will be described below with reference to FIGS. 3A to 3D. As shown in FIG. 3A, it is supposed that the input video signals in the format of sequential scanning include in the 4th line a flicker component A comprising isolated luminance signal. In the 4th line, the component A is reduced by half by coefficient multiplier 13 and outputted through adders 15, 16 as shown in FIG. 3B. Also since being delayed by 1H by 1H-memory 11 and outputted through adders 15, 16, the component A is present in the 5th line. Furthermore, the signals delayed by 1H by 1H-memory 11 are further delayed by 1H by 1H-memory 12, reduced by half by coefficient multiplier 14 and outputted from adder 16 in the 6th line.

As described above, the video signals including the component A shown in FIG. 3A are processed by processing circuit 3 and memorized in frame memory 4 as shown in FIG. 3B.

Figure 3C:
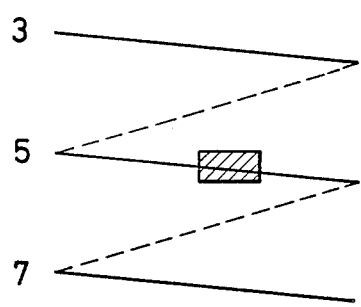
Figure 3D:
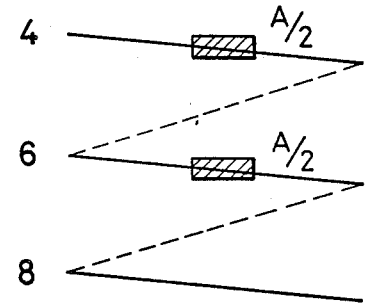

When the video signals memorized in frame memory 4 in the format of sequential scanning are read out in the format of interlaced scanning, the video signals in the odd and even fields are as shown in FIGS. 3C and 3D, respectively. Namely, in the odd field the component A is present in the 5th line while in the even field the component A reduced by half is present in the 4th and 6th lines. Therefore, because the component A is present every one-sixtieth seconds in NTSC (every one-fiftieth seconds in PAL or SECAM) the generation of flickers is prevented.

When the processing described above is made with respect to every horizontal scanning line, the vertical resolution is reduced by half. Therefore, the processing can be made with respect to only the horizontal scanning lines which include flicker components in accordance with the outputs from detecting circuit 9. Namely, the values of coefficients $K_1$ and $K_2$ are controlled according to the detecting results in detecting circuit 9.

What is claimed is:

1. A video signal processing system comprising:
    a processing circuit for processing input video signals including isolated luminance signals, in a format of sequential scanning so that each horizontal scanning line of the video signals does not include the isolated luminance signals,
    a memory for storing the video signals processed by the processing circuit, and
    a reading means for reading out the video signals stored in the memory and generating video signals in a format of interlaced scanning,
    wherein the processing circuit comprises:
        a first delaying circuit for delaying the input video signals by one horizontal scanning period,
        a second delaying circuit for delaying by one horizontal scanning period the video signal delayed by the first delaying circuit,
        a first coefficient multiplier for multiplying the input video signals by a first coefficient,
        a second coefficient multiplier for multiplying the video signals delayed by the second delaying circuit by a second coefficient, and
        an adding circuit for adding the outputs from the first and second coefficient multipliers and the first delaying circuit.

2. A video signal processing system according to claim 1,
    wherein the video signal processing system further comprises
    a detecting circuit for detecting the correlation between the two sequential horizontal scanning lines of the input video signals.

3. A video signal processing system according to claim 1,
    wherein the video signal processing system further comprises
    an analog-to-digital converter for converting the input video signals from analog signals to digital signals, and outputting to the processing circuit, and
    a digital-to-analog converter for converting the video signals read out from the memory from digital signals to analog signals.

4. A video signal processing system according to claim 1,
    wherein the video signal processing system further comprises
    a first low-pass filter for passing the low-frequency components of input video signals, and
    a second low-pass filter for eliminating unnecessary high-frequency components of the video signals read out from the memory.

5. A video signal processing system according to claim 1,
    wherein the video signal processing system further comprises
    a generating circuit for generating clock pulses for storing and reading out video signals to and from the memory.

* * * * *